United States Patent
Angermann et al.

(10) Patent No.: US 10,763,650 B2
(45) Date of Patent: Sep. 1, 2020

(54) CABLE, IN PARTICULAR INDUCTION CABLE, METHOD FOR LAYING SUCH A CABLE AND LAYING AID

(71) Applicant: LEONI KABEL HOLDING GMBH, Nuremberg (DE)

(72) Inventors: Gerhard Angermann, Georgensgmuend (DE); Klaus Bitterwolf, Spalt (DE); Thomas Brunner, Schwabach (DE); Michael Dreiner, Wipperfuerth (DE); Christian Eck, Wipperfuerth (DE); Jan Foerster, Wipperfuerth (DE); Sebastian Goss, Roth (DE); Jens Mosebach, Wipperfuerth (DE); Ulrich Raupach, Bamberg (DE); Rainer Sessner, Roth (DE)

(73) Assignee: LEONI Kabel Holding GmbH, Nuremberg (DE)

( * ) Notice: Subject to any disclaimer, the term of this patent is extended or adjusted under 35 U.S.C. 154(b) by 685 days.

(21) Appl. No.: 15/250,333

(22) Filed: Aug. 29, 2016

(65) Prior Publication Data

US 2016/0372900 A1 Dec. 22, 2016

Related U.S. Application Data

(63) Continuation of application No. PCT/EP2015/054190, filed on Feb. 27, 2015.

(30) Foreign Application Priority Data

Feb. 28, 2014 (DE) .......................... 10 2014 203 777

(51) Int. Cl.
*H02G 1/08* (2006.01)
*H02G 1/10* (2006.01)
(Continued)

(52) U.S. Cl.
CPC .............. *H02G 1/081* (2013.01); *F16L 55/26* (2013.01); *F16L 55/30* (2013.01); *H02G 1/08* (2013.01);
(Continued)

(58) Field of Classification Search
CPC ............ H02G 1/081; H02G 1/08; H02G 1/10; H02G 1/085; H02G 1/088; G02B 6/4463;
(Continued)

(56) References Cited

U.S. PATENT DOCUMENTS 2,742,259 A * 4/1956 Boucher ................ H02G 1/088
254/134.5
3,344,682 A * 10/1967 Bratz ........................ F16C 1/20
464/174

(Continued)

FOREIGN PATENT DOCUMENTS

EP 2250858 B1 8/2011
FR 2660790 A1 10/1991

(Continued)

*Primary Examiner* — Lee D Wilson
*Assistant Examiner* — Seahee Yoon
(74) *Attorney, Agent, or Firm* — Laurence A. Greenberg; Werner H. Stemer; Ralph E. Locher

(57) ABSTRACT

A cable, in particular an induction cable, extends in a longitudinal direction along a longitudinal axis and is provided for laying in a pipe. A laying aid is mounted on the cable. The laying aid is formed so that the cable can be rotated about the longitudinal axis during laying. The cable is laid by a method for laying the cable which extends in a longitudinal direction, in which the laying aid is provided and the cable is laid in the longitudinal direction. The cable is rotated about a longitudinal axis extending in the longitudinal direction during laying.

15 Claims, 5 Drawing Sheets

(51) Int. Cl.
*H05B 6/36* (2006.01)
*F16L 55/30* (2006.01)
*F16L 55/26* (2006.01)

(52) U.S. Cl.
CPC ............... *H02G 1/10* (2013.01); *H05B 6/36* (2013.01); *H05B 2214/03* (2013.01)

(58) Field of Classification Search
CPC . G02B 6/4439; F16C 1/16; F16C 1/20; F16C 1/26; F16C 1/105; F16L 55/28; F16L 55/26; F16L 55/30; F16L 55/40
USPC ...... 104/138.2; 166/241.3, 241.6; 254/134.4, 254/134.5, 134.6
See application file for complete search history.

(56) References Cited

U.S. PATENT DOCUMENTS

| | | | | |
|---|---|---|---|---|
| 3,890,905 A | * | 6/1975 | Clavin | F16L 55/32 104/138.2 |
| 4,055,315 A | * | 10/1977 | Gvelesiani | F16L 55/38 104/138.2 |
| 5,551,349 A | * | 9/1996 | Bodzin | F16L 55/30 104/138.2 |
| 5,749,397 A | * | 5/1998 | Molaug | F16L 55/40 104/138.2 |
| 6,250,394 B1 | * | 6/2001 | Mashburn | E21B 17/1057 166/241.3 |
| 6,629,568 B2 | * | 10/2003 | Post | E21B 17/1014 166/241.1 |
| 6,830,103 B2 | * | 12/2004 | Bowles | E21B 17/1057 166/241.3 |
| 6,926,257 B1 | * | 8/2005 | Alcantara | F16L 7/00 254/134.3 FT |
| 8,766,146 B2 | | 7/2014 | Diehl | |
| 8,770,303 B2 | * | 7/2014 | Aguirre | E21B 4/18 166/241.6 |
| 8,775,100 B2 | * | 7/2014 | Choung | F16L 55/28 702/35 |
| 2011/0011299 A1 | * | 1/2011 | Beck | F16L 55/30 104/138.2 |
| 2012/0053857 A1 | * | 3/2012 | Choung | F16L 55/28 702/41 |
| 2014/0221213 A1 | * | 8/2014 | Fukuda | H02G 1/081 505/163 |
| 2014/0263289 A1 | | 9/2014 | Mosebach et al. | |

FOREIGN PATENT DOCUMENTS

| | | |
|---|---|---|
| JP | 56135820 A | 10/1981 |
| JP | 59187312 A | 10/1984 |
| SU | 855816 A1 | 8/1981 |
| SU | 915152 A1 | 3/1982 |
| WO | 2013079201 A1 | 6/2013 |

* cited by examiner

CABLE, IN PARTICULAR INDUCTION CABLE, METHOD FOR LAYING SUCH A CABLE AND LAYING AID

CROSS-REFERENCE TO RELATED APPLICATION

This is a continuation application, under 35 U.S.C. § 120, of copending international application No. PCT/EP2015/054190, filed Feb. 27, 2015, which designated the United States; this application also claims the priority, under 35 U.S.C. § 119, of German patent application No. DE 10 2014 203 777.8, filed Feb. 28, 2014; the prior applications are herewith incorporated by reference in their entirety.

BACKGROUND OF THE INVENTION

Field of the Invention

The invention relates to a cable, in particular an induction cable, which extends along a longitudinal axis in a longitudinal direction and is provided to be laid in a pipe, wherein a laying aid is mounted on the cable. In addition, the invention relates to a method for laying a cable, in particular an induction cable, which extends in a longitudinal direction, where a laying aid is provided and the cable is laid in the longitudinal direction. In addition, the invention relates to a laying aid for laying a cable.

A cable of this type serves, in particular, for use as a so-called induction cable (also alternatively called an inductor) for realizing one or more induction fields. The cable, in this connection, is provided, in particular, for the inductive heating of oil sand deposits and/or extra-heavy oil deposits, also called reservoirs. The cable is typically drawn into an underground pipe for this purpose. The pipe runs in an appropriate manner through the reservoir, for example at a depth of approximately 100 m and along a stretch of approximately 2 km. Such an application of an induction cable of this type is to be found for example in European patent EP 2 250 858 B1, corresponding to U.S. Pat. No. 8,766,146.

To construct an induction field and to realize the inductive heating system, the cable includes several cable cores which are separated at defined separation points within a grid dimension with a defined length of, for example, several tens of meters. Each of the cable cores, in this case, is divided into a number of core portions by the separation points.

Several cable cores are preferably combined inside the cable to form core groups, the separation points or interruptions in the cores of a respective core group being located substantially at the same length position. Typically, there are two core groups, the separation points of which are displaced relative to one another by half the grid dimension. In other words: the separation points of a first core group are arranged in the longitudinal direction halfway between two separation points of a second core group. As a result, there is an overlap between the core portions of different groups which serves, in particular, for realizing an induction cable.

In order to improve the electrical characteristics and in particular the induction field, the cable cores are typically not run parallel to the cable longitudinal direction, but are, for example, stranded together. As an alternative to this, several cable cores are combined to form part cables and the part cables are stranded or rotated together. As a result, a spiral-shaped arrangement of the cable cores is produced in particular.

A cable of this type is described, for example, in international patent disclosure WO 2013 079 201 A1, corresponding to U.S. patent publication No. 2014/0263289. The document discloses a cable core for a cable, in particular an induction cable, having several cable cores of this type which comprise, in each case, a conductor surrounded by insulation. In addition, the respective cable core, that is to say a conductor surrounded by an insulating shell, is interrupted in the longitudinal direction of the cable at predetermined length positions by separation points thus realizing two core ends. A connector with an insulating spacer is arranged to join the ends and the core ends are fastened to the connector on both sides of the spacer.

To realize an induction cable, several such cable cores are combined in a typically multi-stage stranding process, for example in three stages as follows: first of all, a core bundle is realized where several layers of cable cores are stranded together. For example, an inner layer includes six cable cores and an outer layer includes twelve cable cores. Several such core bundles, for example seven, are then stranded together about a further strain relief device and form a part cable. Several such part cables, for example three, are then stranded together to form the induction cable. With each stranding, in this case, the lay direction is suitably adjusted, for example in such a manner that two consecutive strandings form one SZ stranding. As the induction cable is typically produced directly with a predetermined overall length, which is, for example, 2 km, the combining, that is to say in particular the stranding, of the cable cores is correspondingly expensive.

A number of sheathings or bandings are possibly provided for combining in each case several cable cores to form core bundles, several core bundles to form the part cable and/or several part cables to form the induction cable. In addition, in particular each of the cable cores contains an insulating shell. The complete induction cable frequently includes several hundreds of individual cable cores and accordingly contains a large diameter, for example of approximately 8 cm. As a result, the induction cable is difficult to handle, that is to say, for example, to transport and/or to roll up for transport.

The induction cable is typically completely manufactured and then transported to the site of use. It is then laid there, typically in a pipe as already explained above.

In order to simplify the drawing-in of a cable into a pipe, German patent DE 822 264 discloses fastening a clip on a cable, the clip being provided on its outside surface with ball bearings mounted in ball sockets. Drawing-in several cables simultaneously in a longitudinal direction is made simpler as a result. The clip encompasses the several cables for this purpose.

SUMMARY OF THE INVENTION

The object underlying the invention is to provide an improved cable, in particular an induction cable, which is layable in a simpler manner. In addition, a suitable method for laying such a cable is to be provided as well as a suitable laying aid.

To this end, it is provided that a cable, in particular an induction cable, extends along a longitudinal axis in a longitudinal direction and is provided to be laid in a pipe. In this case, a laying aid is mounted on the cable which is realized in such a manner that the cable, when being laid, is rotated about the longitudinal axis by the laying aid. As a result of the laying aid, that is to say when the cable is being laid, that is to say in particular when the cable is drawn into the pipe, the cable is rotated or even twisted. For example, the cable includes in an appropriate manner several part cables which, once laid, are present arranged rotated with one another, that is to say that they run, in particular, in a spiral-shaped manner (or even helically) along the longitudinal axis. When the cable is being laid, the part cables are advantageously also rotated as a result of the cable rotating. That is to say, in particular, that the part cables are able to be stranded together along the longitudinal direction during laying with the help of the laying aid and are stranded during laying. As a result, the production and/or the transport of the cable is simplified with the preferred effect that one production stage, for example the last stage of a multi-stage stranding process, is not effected until laying. It is consequently possible, in particular, to provide the part cables separately first of all in place of the complete cable, to transport them to a site of use and finally to combine the part cables together to form the finished cable at the site of use. The cable, realized in this manner, is able to be produced, in particular, in a cost-efficient manner and/or with less expenditure.

In a preferred development, the laying aid contains a carrier, on which are mounted a number of rolling elements. These are supported in each case so as to be rotatable about an axis of rotation, wherein each of the axes of rotation is at a predetermined setting angle with respect to the longitudinal direction. The rolling elements are, for example, wheels or rolling cylinders having a rolling surface which is arranged radially around the axis or rotation. In this case, the respective axis of rotation and the longitudinal direction of the cable enclose the setting angle.

In a suitable development, the carrier is fastened on the cable and the cable is layable in a pipe with an inside wall. To this end, part of the rolling surface abuts against the inside wall. In particular, the rolling element rolls along the inside wall in a rolling direction during laying. In an alternative suitable development, the carrier is part of the pipe or is the pipe itself and the rolling elements are, for example, mounted at regular spacing's along the inside wall. The rolling surface then rolls in particular along the cable.

The rolling direction, in this case, is perpendicular to the axis of rotation. If, for example, the rolling direction is the same as the longitudinal direction, the setting angle is then 90° and the axis of rotation is perpendicular to the longitudinal direction. In this case, the cable is not rotated during laying. In order to obtain a rotation in an advantageous manner, the setting angle is preferred to be smaller than 90° and greater than 0°. As a result, is it in particular possible to rotate the cable and simultaneously move it in the longitudinal direction, in other words, to draw the cable into the pipe when rotating (turning) it.

In a preferred manner, the pipe contains an entry opening at which are provided several part cables which are strand able together by means of the rotation when drawn into the pipe. The term drawing-in is also to be understood, in particular, as the force necessary to move the cable in the longitudinal direction not necessarily being just a tensile force, but additionally or in place thereof also being a shear force. In other words: the term drawing-in is understood here in general as also pressing-in or pushing-in.

In a further preferred development, the setting angle is adjustable and for adjusting the setting angle the rolling elements are in each case mounted so as to be rotatable (or also pivotable) about an axis of rotation which extends radially from the longitudinal axis. In particular, the axis of rotation of the respective rolling element is perpendicular to the axis of rotation thereof. As a result of rotating the cable, the cable contains, in particular, a period length inside which each of the part cables is guided in a spiral-shaped manner once around the longitudinal axis. As a result of adjusting the setting angle, it is in particular possible to select and/or to adjust a suitable period length. In particular, it is possible to select and/or adjust a suitable lay length for a stranding operation.

Rotating the rolling element about the axis of rotation for adjusting the setting angle is effected, for example, by a motor or manually by a user. In a preferred manner, the setting angle is adjustable during laying. As an alternative to this, the setting angle is adjustable prior to laying and is predetermined during laying. Appropriately, the laying aid contains a fixing, holding or latching-in device which ensures the setting angle is fixed in such a manner that the rolling element maintains the setting angle during laying. This results, in particular, in the unintentional moving of the setting angle being advantageously avoidable.

In a preferred development, the rolling elements are arranged in each case at an adjustable spacing from the longitudinal axis. In other words: the rolling elements are arranged at an adjustable spacing from the longitudinal axis in the radial direction. As a result, it is in particular possible to adjust the rolling elements in such a manner that the respective rolling surface thereof abuts against a contact surface, rests on a contact surface or is positioned on a contact surface in an appropriate manner for rolling. The contact surface, in this case, is, for example, the inside wall of the pipe or the cable.

The spacing is adjustable, for example, by displacing the rolling elements in the radial direction. The displacing is preferably effected in an automatic manner, appropriately by a spring element. As a result, optimum contact between rolling element and contact surface is ensured in particular during laying. As an alternative to this or in addition to it, a manual or motorized adjustment mechanism is provided. As a result, it is advantageously possible to adjust the spacing in the radial direction in dependence on the dimensions of the pipe and/or of the cable. The pipe preferably has an inside diameter and the cable comprises an outside diameter, it then being in particular possible to adjust the laying aid suitably for different ratios of inside diameter to outside diameter. For example, if a cable with an outside diameter is specified, it is then possible to draw the cable into pipes with different inside diameters.

In an expedient manner, the carrier includes a frame which encompasses the cable with an outside surface on which the rolling elements are mounted. A suitable arrangement of the carrier on the cable is ensured, in particular, as a result of a carrier being mounted on the cable. The frame is preferably fastened on the cable, for example clamped on the cable in the manner of a clip. As an alternative to this or in addition to it, the frame is connected to the cable in a materially-bonded manner, for example bonded or welded.

In a preferred development, the frame contains a number of rounded frame corners and the cable includes several part cables, wherein one of the part cables abuts against the inside of the frame in each corner. In a preferred manner, the part cables are held together simply by the frame 24. A particularly space-saving arrangement is realized in particular as a result. As an alternative to this, however, additionally provided, for example, is a materially-bonded connection between the part cables themselves and/or a banding which surrounds all the part cables together.

In cross section, that is to say transversely with respect to the longitudinal direction, the cable contains in a preferred manner a multi-cornered handling profile. For example, the cable includes three part cables, and the handling profile is a triangle with rounded corners. The frame, in a preferred manner, is then also triangular with rounded frame corners and each of the part cables abuts in each case against the inside of one of the frame corners. In particular, a positive locking (e.g. form-lock connection) and non-positive locking connection between the cable and the carrier is improved as a result of the rounded frame corners. The carrier sliding relative to the cable in particular in the direction of rotation is prevented in an expedient manner as a result.

The rounded frame corners are connected to cross webs in a preferred manner for realizing the frame 24. In a preferred manner, the rolling elements are arranged on the cross webs, as a result of which the laying aid is particularly space-saving. As an alternative to this, the rolling elements are arranged on the frame corners or both there and on the cross webs.

In a preferred manner, the cable contains in the longitudinal direction a strain relief device which is fastened on the laying aid. In particular, in the case of an induction cable, the separation points of the individual cable cores present weak points with reference to a force directed in the longitudinal direction. Such a force acts in particular when the cable is drawn into the pipe. The strain relief device consequently ensures in an expedient manner that the cable is drawn-in reliably and is realized, for example, as a cord which runs in the longitudinal direction.

It is preferred for the strain relief device to be realized in a continuous manner. To this end, the laying aid contains a suitable guide-through in which the strain relief device in particular is fastened, for example clamped, bonded or welded. As an alternative to this, the strain relief device is interrupted by the realization of ends and the ends are each fastened on the laying aid by a suitable connection.

In an expedient manner, the laying aid contains a drive device. The drive device serves in an advantageous manner for driving the rolling elements. As a result, the cable is in particular simpler to lay. In particular, a smaller force for drawing-in is required than in the case where a drive device is not present. Appropriately, the cable is layable in an automatic manner. The drive device includes, for example, one motor or a plurality of motors. For example, one motor can be provided for each of the rolling elements.

In an advantageous development, the laying aid contains a helical profiling. This is realized, in particular, on the inside wall of the pipe and/or on the cable and/or on the carrier. For example, the profiling is realized on the inside wall in the manner of an internal thread or on the cable as a thread. The profiling ensures, in particular, that the cable is guided in a spiral-shaped manner when being drawn into the pipe. As a result, the cable is advantageously rotated with the advantages already named above.

For example, mounted on the inside wall of the pipe are a number of grooves (or also guide grooves, guide rails) in which the cable is guided during laying. To this end, the cable advantageously does not comprise a round cross section, but is realized rather, for example, in the manner of the triangle already mentioned above. At least one of the part cables is preferably inserted at least in part in a groove and as a result is guidable in a spiral-shaped or helical manner in the longitudinal direction.

Guiding by means of a profiling is advantageously realized in combination with rolling elements. In this case, said rolling elements engage in a preferred manner in a respective groove and are guided in this manner. The rolling elements are expediently positioned in a suitable manner by the groove, in particular with reference to the setting angle.

The setting angle is appropriately predefinable by the profiling in such a manner that the profiling contains a predefinable periodicity in particular when it is realized. As a result, it is in particular possible to dispense with a fixing device.

In an appropriate manner, the cable contains a profiling, for example a number of guide studs or guide mandrels, which engage in each case in a groove, are fastened at predefined spacing's on the cable. As an alternative to this or in addition to it, the cable contains a sheathing which contains an outside surface which is profiled in a spiral-shaped manner. For example, extruded onto the cable is a sheathing, on the outside surface of which are realized a number of spiral-shaped longitudinal ribs which extend in the longitudinal direction. In an alternative development such longitudinal ribs or another profiling of the cable are combined with corresponding guide studs mounted on the inside wall of the pipe.

For operation, the cable is connected, in particular, to a power source in such a manner that a current flows in the cable and a voltage is applied. In the event of an induction cable, the power source is typically an alternating current source and the current and the voltage have a frequency.

In an expedient manner, the laying aid contains a sensor module, with at least one sensor for determining at least one value of an operating parameter of the cable. In this case, operating parameters are understood, for example, as the current, the voltage and/or the frequency. A further operating parameter is, for example, a temperature measured in or on the cable. It is possible to monitor the functionality of the cable, in particular, as a result of determining the value of one of the operating parameters. Several values of the operating parameter are detected appropriately over a given time period for continuous monitoring.

The induction cable is regularly placed into a reservoir (or also generally in the ground), for example into an oil sand field, or is buried in the same. The state of the reservoir is characterized by one or several environmental parameters, for example temperature, density, viscosity or conductivity of the reservoir. One parameter, in this case, can assume different values at different points in the reservoir. In order to monitor the state of the reservoir, the sensor module or modules is or are realized additionally or alternatively for determining at least one value of such an environmental parameter. In the event of several laying aids, it is preferred to arrange one sensor module in each case on several of said laying aids.

A method for laying a cable which extends in a longitudinal direction is described below. In this case, the advantages and further developments provided in conjunction with the above-described cable also apply analogously to the method and to the further developments thereof.

In a preferred manner, in the case of a method for laying a cable, in particular an induction cable, which extends in the longitudinal direction, a laying aid is provided and the cable is laid in the longitudinal direction. In this case, when being laid, the cable is rotated about a longitudinal axis which extends in the longitudinal direction. An improved method for laying an induction cable is provided in particular as a result.

The cable is fed, for example slid appropriately to an entry opening of the pipe. In a preferred manner, the cable is merely rotated inside the pipe and not outside the pipe, in particular the cable, in this case, is also moved in the longitudinal direction. In other words, the cable contains a portion arranged outside the pipe and a portion arranged inside the pipe, the portion arranged outside not being rotated, but the portion arranged inside the pipe being rotated. This is preferably achieved in that the laying aid advantageously only acts inside the pipe. As a result, it is in particular possible to rotate a cable when laying. A cable to be rotated is consequently producible, in particular, as a non-rotated cable, as a result of which the cable can be produced in an easier manner. In other words: the rotating is not performed at the factory, but is carried out during laying. Quite apart from this, however, in particular in the case of cables rotated in multiple stages, it is possible to provide further rotations which are additionally carried out at the factory. In this case, in particular the final rotation is performed during laying.

The cable appropriately includes several part cables which are stranded together when being laid. As a result, it is in particular possible to save on a final stranding stage during the production of a cable. As a result, the production of the cable is advantageously simplified. During stranding, the part cables with a preferentially predefinable lay length are stranded together. This is adjusted in an appropriate manner depending on the requirement.

In a suitable development, the laying in the longitudinal direction is carried out as drawing into a pipe which extends in the longitudinal direction. As a result, it is possible, in particular to lay the cable into a pipe which is, in particular, already present. For example, to develop an oil sand area a pipe has already been laid in the area and an induction cable is drawn into the pipe and at the same time is rotated and/or stranded.

In a further suitable development, the laying aid includes a profiling which is realized on the inside surface of the pipe and/or on the cable. This ensures, in particular, that the cable is guided in a spiral-shaped manner when drawn into the pipe. In an expedient manner, the cable is rotated in particular by rolling elements which are mounted on the laying aid and are set at an angle.

In order to simplify the drawing-in process, a lubricant or glide agent is advantageously provided which, for example, is applied onto the rolling elements during the drawing-in process or is applied onto the inside wall of the pipe prior to the drawing-in process. In particular when guide studs are used, the laying aid, in particular the carrier, expediently contains a lubricant store, from which the lubricant is automatically suitably applied onto the guide studs during the drawing-in process. A profiling, which is realized as a number of ribs, is provided as an alternative in place of the guide studs. For example, the cable, in this case, contains an operating line for guiding lubricant along the longitudinal direction. It is then possible, by suitable outlets, for the lubricant to be applied, for example, on the cable and in particular in a space between the cable and the inside wall of the pipe.

After laying, the laying aid advantageously remains on the cable and/or in the pipe. It is in particular possible in an expedient manner to use the laying aid correspondingly also for pulling out the cable. This is in particular advantageous if the cable is to be, for example, serviced or exchanged.

Other features which are considered as characteristic for the invention are set forth in the appended claims.

Although the invention is illustrated and described herein as embodied in a cable, in particular an induction cable, a method for laying such a cable and s laying aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
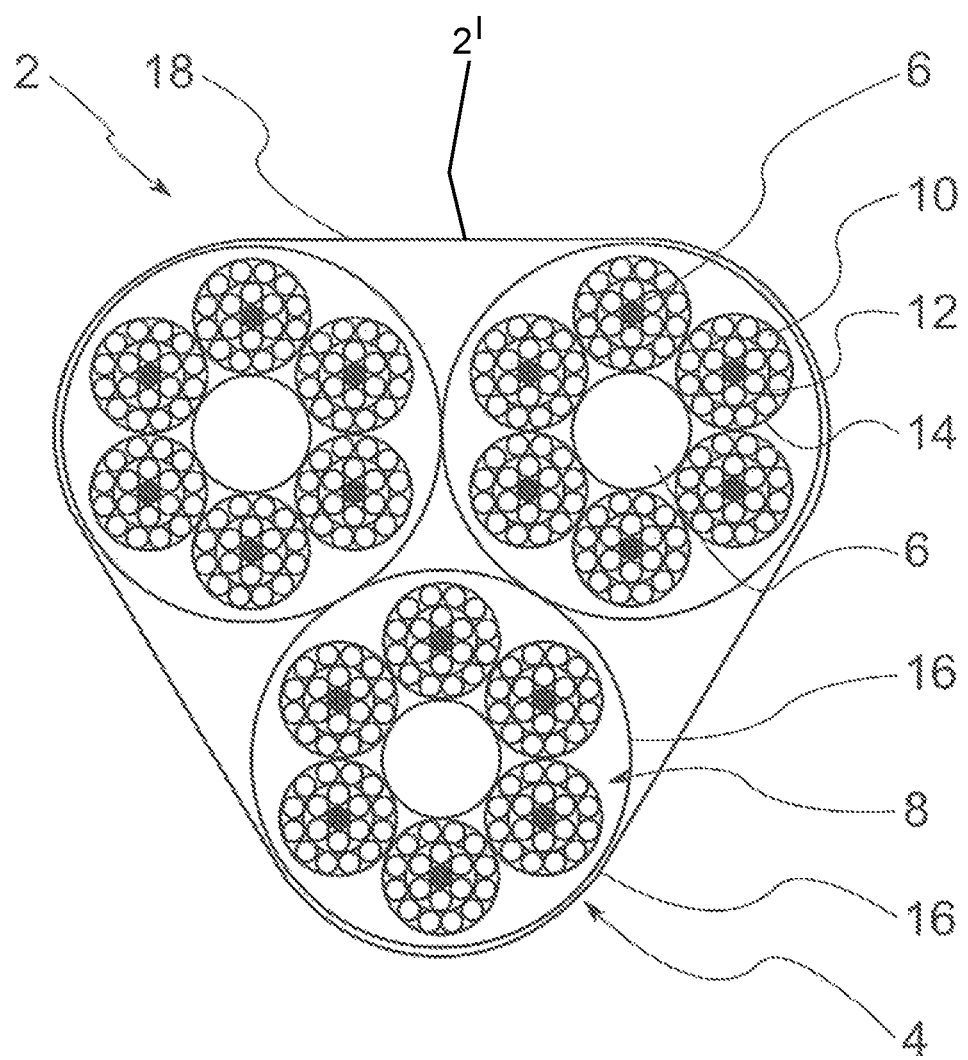
FIG. 1 is a diagrammatic, cross-sectional view of a cable according to the invention.

Referring now to the figures of the drawings in detail and first, particularly to FIG. 1 thereof, there is show a schematic and cross-sectional representation of an exemplary embodiment of a cable 2. The cable 2 shown here includes three part cables 4 which are stranded together. Each of the part cables 4 includes six core bundles 8 stranded around a strain relief device 6. Each of the core bundles 8 contains, in turn, eighteen cable cores 10 which are arranged around the strain relief device 6. In this case, the core bundle 8 contains an inside layer 12 comprising six cable cores 10 and an outside layer 14 containing twelve cable cores 10. The inside layer 12, the outside layer 14, the part cable 4 and the overall cable 2 are each surrounded in a preferred manner by an additional sheathing 16.

In the development shown here, the outermost sheathing 16 surrounding the three part cables 4 is realized as a banding. The resulting cross-sectional profile of a cable body 2' of the cable 2 is thus a triangle 18 with rounded corners. In particular, the triangle 18 in the embodiment shown here corresponds to an edging defined by the sheathing 16. In an alternative embodiment, not shown here, the sheathing 16 is realized with a circular cross-sectional profile in such a manner that the entire cable is also substantially circular in cross section.

In the case of the cable 2 shown, the individual core bundles 8 are formed in each case as stranding elements with a 1-6-12 stranding of individual elements. The central individual element, in this case, is realized as a strain relief device 6. The core bundle 8 produced in such a manner comprises, for example, a diameter within the range of between approximately 8 and 15 mm, in particular approximately 12 mm.

The individual part cables 4 are realized, in turn, as a stranded bond consisting of the central strain relief device 6 and six core bundles 8 stranded around it. The stranded bond is also surrounded by a sheathing 16 in the exemplary embodiment, but this is not compulsory, which sheathing is realized, for example, as an injected-on, extruded sheathing or also as a banding, for example by a polyester tape. The part cable 4 preferably contains a diameter within the range of a few centimeters, for example within the range of between 2.5 and 6 cm and in particular within the range of approximately 4 cm.

A central strain relieving core and/or another operating line is/are additionally inserted expediently, again in a manner not shown, between the overall three part cables 4.

The maximum width of the cable 2, that is to say in the event of the triangular development according to FIG. 1 one side length of the isosceles triangle 18, is, once again, several centimeters, in particular approximately between 6 and 12 cm and preferably approximately 8 cm. The three part cables 4 are, once again, stranded together. The cable 2 is expediently also surrounded by a sheathing 16 which is realized by a banding method. In an expedient manner, the sheathing 16 contains a sheathing thickness within the range of a few millimeters, in particular within the range of between 2.5 and 5 mm.

The realized cable 2 contains a length of preferably between several hundreds of meters and a few kilometers.

Figure 2:
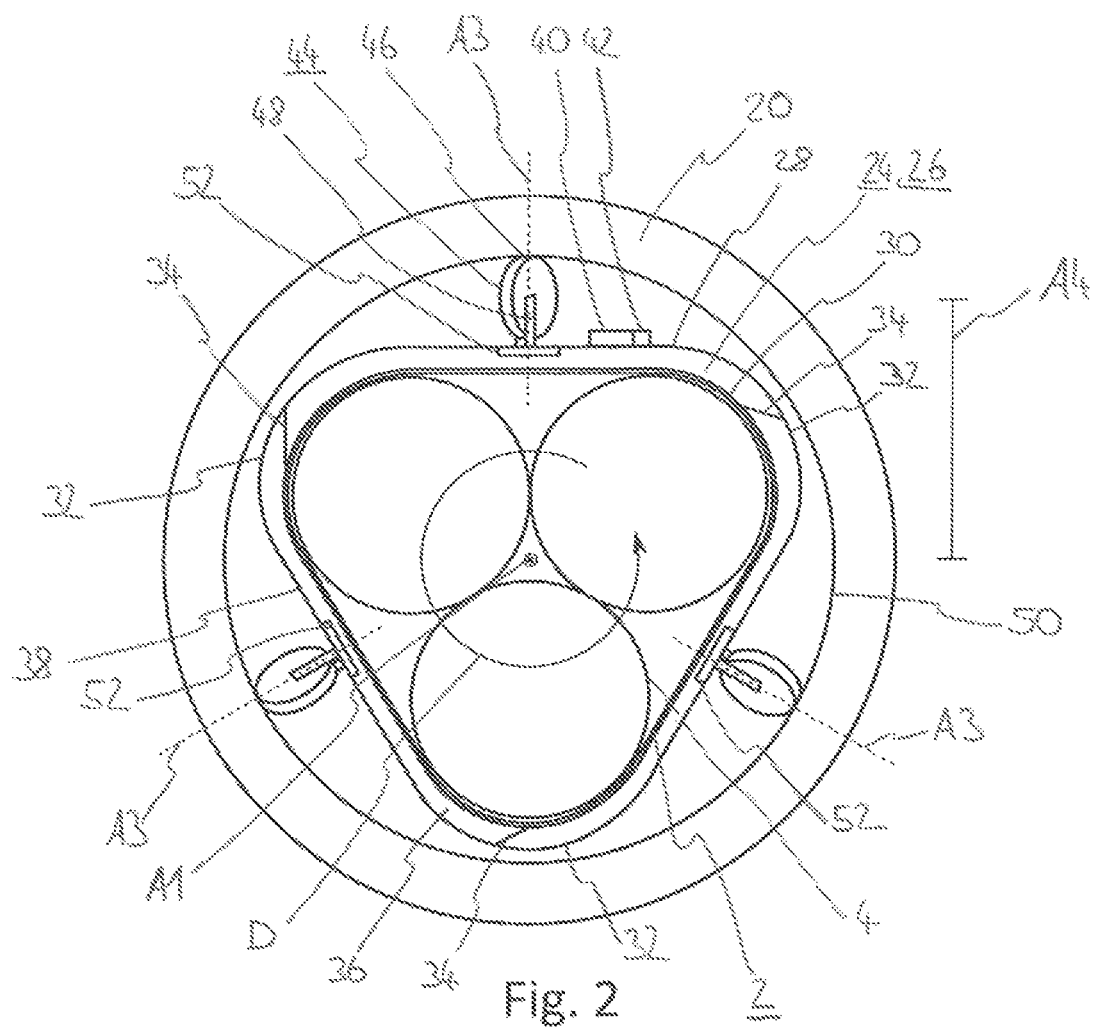
FIG. 2 is a cross-sectional view of the cable according to FIG. 1 having a frame, in a pipe.

FIG. 2 shows the cable 2 according to FIG. 1 in a simplified representation. The cable 2 is arranged in a pipe 20 and is rotatable in the pipe 20 by a laying aid 22. In particular, the cable 2, with a movement in the longitudinal direction L, is rotatable in a direction of rotation D about a longitudinal axis A1. In this case, the longitudinal direction L and the longitudinal axis A1 here are perpendicular to the plane of the figure.

The laying aid 22 includes, in the embodiment shown here, a carrier 26 which is realized as a frame 24 and is developed in the manner of a triangle, that is to say as a triangle with rounded corners. The laying aid 22 preferably includes several such frames 24. The frame 24 contains an outside surface 28 and an inside surface 30 and is mounted in such a manner on the cable 2 that the three part cables 4 are engaged around by the frame 24 and each of the part cables 4 is inserted in each case in a frame corner 32 on the inside of the frame, that is to say abuts against the inside surface 30 of the frame 24. In this case, the sheathing 16 surrounding the part cables 4 is arranged in the frame corners 32, in particular between the inside surface 30 of the frame 24 and the part cable 4 inserted in the respective frame corner 32.

In FIG. 2, the frame 24 can be broken down advantageously into three parts 36 along three separation points 34, as a result of which the mounting of the frame 24 on the cable 2 is made easier. The separation points 34 are arranged here on the frame corners 32 and the parts 36 include in each case a web 38 of the frame 24. As an alternative to this, the separation points 34 are arranged on the webs 38. It is also possible for more or less than three separation points 34 to be provided. In addition, at least one separation point 34 is replaced by a hinge (not shown here) in such a manner that the frame 24 is able to be placed about the cable 2 in the manner of a clip. The separation points 34 are provided in a preferred manner with fastening elements (not shown here) in order to improve in particular the stability of the frame 24. For example, screw or clamping connections are provided. The frame 24 is additionally appropriately fastened on the cable 2, for example the frame 24 and the sheathing 16 are bonded.

The frame 24 shown in FIG. 2 additionally contains a sensor module 40 with a sensor 42. To generate an induction field, each of the cable cores 10 is acted up-on with a current and a voltage at a predetermined frequency. The sensor 42 is then, for example, a Hall sensor, by which the sensor module 40 monitors the induction field. In an embodiment not shown here, a number of operating lines are provided in the cable 2, for example temperature sensors realized as fiber optic cable. These are then connected to one or several sensor modules 40.

A number of rolling elements 44 are arranged on the outside surface 28 of the frame 24, three in FIG. 2. These are realized as rollers with a rolling surface 46 and are mounted on the frame 24 by a support 48 so as to be rotatable about an axis of rotation A2. As an alternative to this, the rolling elements 44 are realized as rolling cylinders or are even realized in a cone-shaped manner. In particular, the rolling elements 24 are realized in a rotationally symmetrical manner. The pipe 20, in this case, contains an inside wall 50 along which the rolling elements 44 roll. In this case, these are set at a setting angle W with respect to the longitudinal direction L, as becomes clear in particular in combination with FIG. 3. The figure shows a schematic representation of a top view of the cable 2 according to FIG. 2. In addition, two frames 24 with rolling elements 44 are shown. The frames 24 are mounted at predetermined spacing's A along the longitudinal direction L.

The axis of rotation A2 of the respective rolling element 44 and the longitudinal direction L enclose the setting angle W. The setting angle is, once again, adjustable as a result of rotating the rolling element 44 about an axis of rotation A3, for example by a motor. In an expedient manner, a fixing device (not shown here in any detail) is provided by way of which, in particular, an unintentional rotation about the axis of rotation A3 is inhibited. For example, a locking mechanism or another latching device is provided in order to restrict the rotation in a suitable manner.

The rolling elements 44 are mounted in each case at a spacing A4 from the longitudinal axis A1 in the radial direction. In a preferred manner, the spacing A4 is adjustable, for example by a spring element (not shown here) for automatic adjustment. As a result, it is in particular possible to compensate for irregularities when rolling or to use the frame 24 for pipes 20 with different diameters.

As a result of adjusting the setting angle W, the turning of the cable 2 when run in the longitudinal direction L through the pipe 20 is advantageously adjustable, in particular when it is being drawn into the pipe 20, the cable 2 experiences an advance which is translated by the laying aid 22 at least in part into a rotation or also a turn. In particular, the ratio of advance to rotation is then adjustable by means of the setting angle W. In particular, as a result of the rotation, the cable 2 comprises a spiral form, with a period P which is adjustable by the setting angle W, that is to say is choosable or pre-determinable. In the exemplary embodiment shown here, in particular as a result of advancing the cable 2 in the longitudinal direction L, the three part cables 4 with a lay length corresponding to the period P are stranded together.

A drive device 52 is provided on the laying aid 22, in particular on each of the frames 24, for driving the rolling elements 44. As a result, for example the drawing-in of the cable 2 into the pipe 20 is simplified to the effect that a tensile or shear force required for the drawing-in is reduced. The drive device 52 includes in FIG. 2 three motors per frame which each drive one of the rolling elements 44. As an alternative to this, it is possible to drive simply only part of the rolling elements 44, for example just one. It is also possible as an alternative to use simply one motor for several rolling elements 44. This is expedient, for example, when several rolling elements 44 are mounted on one web 38.

Figure 3:
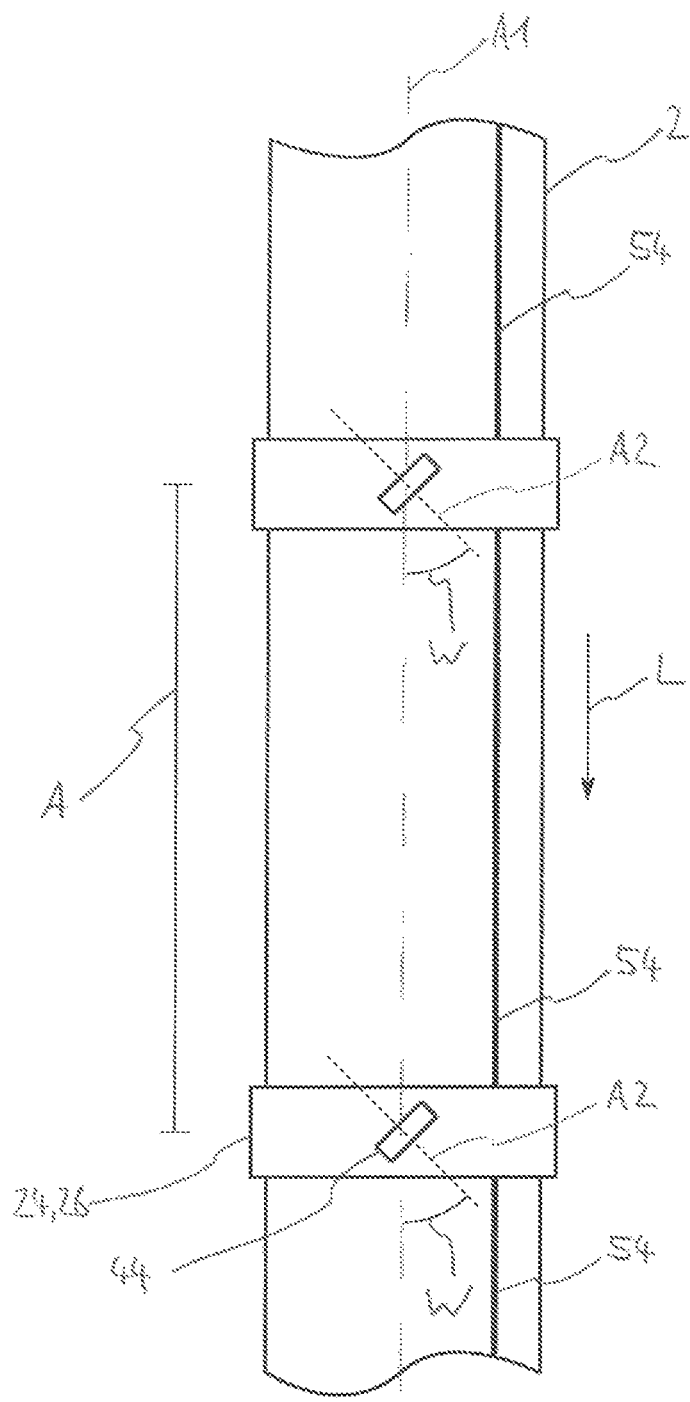
FIG. 3 is a top view of the cable according to FIG. 2.

FIG. 3 shows in addition that a strain relief device 54 is provided advantageously in the longitudinal direction L. This is developed here as a cord which extends in the longitudinal direction L, for example produced from Kevlar. The strain relief device 54 is in particular fastened on each of the frames 24, as a result of which a continuous strain relief device 54 is ensured.

Figure 4:
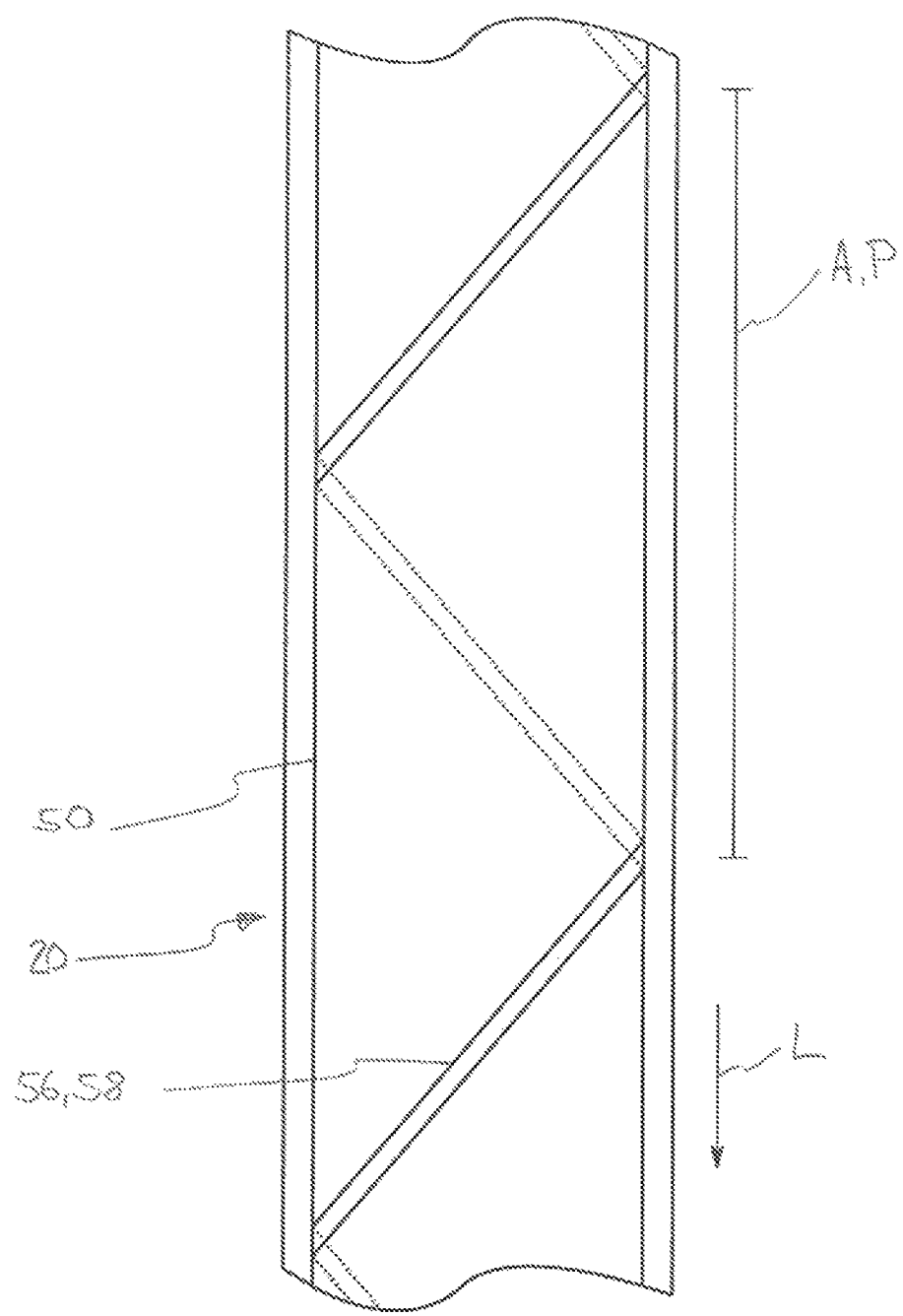
FIG. 4 is a top view of an alternative pipe.

FIG. 4 shows an alternative pipe 20 which, as part of the laying aid 22, contains an inside-wall profiling 56, that is to say it is realized on the inside wall 50 thereof. This is developed here as a groove 58 which extends at an angle with respect to the longitudinal direction L along the inside wall 50 of the pipe 20. In particular, the profiling 56 is spiral-shaped as a result with a corresponding period P. In combination with the carrier 26 shown in FIGS. 2 and 3, the profiling 56 serves, for example, as a receiving device or also as a rail for at least one of the rolling elements 44. In an advantageous manner, the spacing A of the carriers and the period P are selected in such a manner that one rolling element 44 of each frame 24 engages in the groove 58. In a suitable further development, several grooves 58 are provided, for example in such a manner that each of the three rolling elements 44 shown in FIG. 2 engage in each case in one groove 58. In an alternative (not shown here), the cable 2 is provided with a round sheathing 16 and the grooves 58, that is to say the profiling 56, is arranged on the sheathing 16, in particular is realized from the same, for example by an extrusion method. The rolling elements 44 are then expediently arranged on the inside wall 50 of the pipe 20 and are in particular set at an angle in a suitable manner.

As an alternative to this, in an embodiment that is not shown here in further detail, the cable 2 is realized with a round cross section and as profiling 56 includes a rib which is realized on the sheathing 16 and engages in an appropriate manner in a groove 58 on the inside wall 50 of the pipe 20 according to FIG. 3 and, as a result, when the cable 2 is drawn in, brings about a rotation of the same. The profiling 56 accordingly includes, in particular, both a profiled cable 2 and a profiled inside wall 50 of the pipe 20. As an alternative to this, a number of guide pins or studs or nubs are advantageously provided in place of a rib 58. As a result, it is in particular possible to save on material as at least part of the profiling 56 does not have to be produced so as to be continuous.

In a suitable realization that is not shown here, a frame 24 according to FIG. 2 comprises, in place of the rolling elements 44, a number of guide pins which advantageously engage, for example in a similar manner to FIG. 4., in an inside wall profiling 56 of the pipe 20 or rest in the profiling. The embodiment is particularly simple as it is possible to dispense with moving parts, in particular the rolling elements 44.

Figure 5:
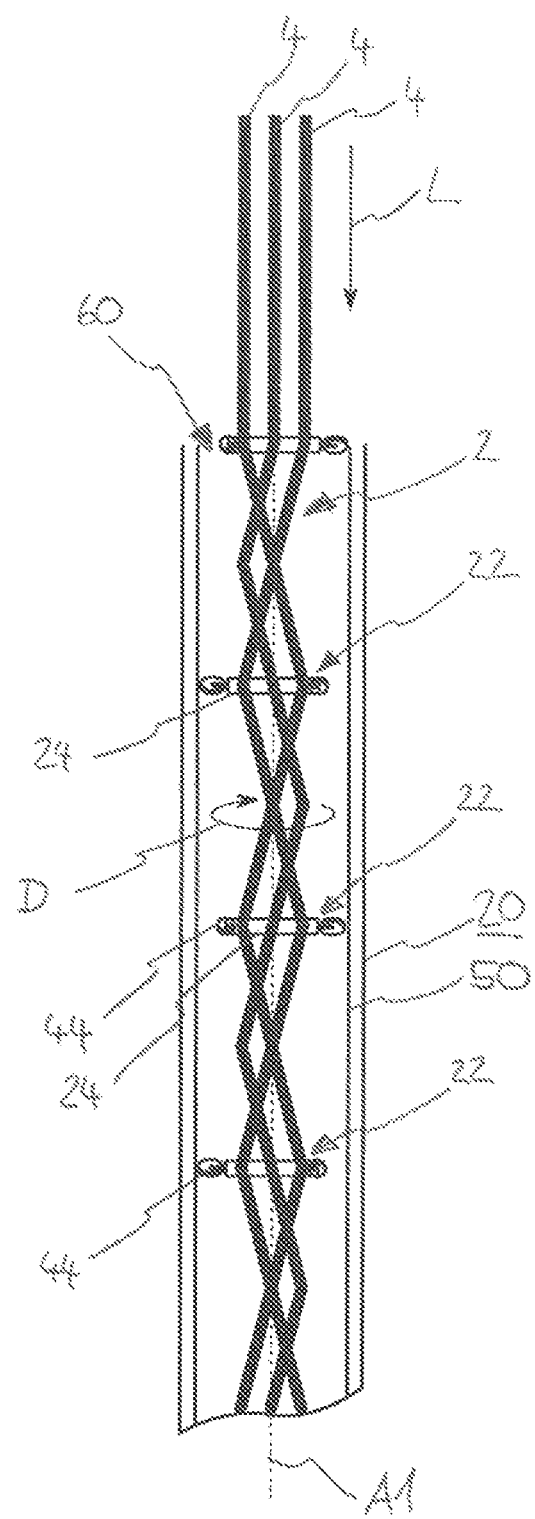
FIG. 5 is a schematic representation of a drawing-in of the cable according to FIG. 1 into the pipe.

FIG. 5 shows a schematic representation of the drawing-in of the cable 2 into the pipe according to FIG. 2. The cable 2 shown here includes the part cables 4 which are present not stranded or rotated outside the pipe 20, but are run parallel to one another for example. In said case, it is possible for the three part cables 4 to be surrounded and held together by one common sheathing 16, for example a banding. The sheathing 16 is preferably sufficiently elastic and/or deformable with reference to torsion, as occurs for example in the case of a subsequent rotation. As an alternative to this, the part cables 4 are provided as single cables, as a result of which in particular the transport of the cable 2 to the site of use, that is to say here an entry opening 60 of the pipe 20, is simplified to the effect that the entire cable 2 does not have to be transported, but just sub-units of the same, that is to say in particular the part cables 4. As the part cables comprise a smaller diameter than the cable 2 which is assembled from them, the handling thereof is correspondingly simplified.

In FIG. 5 the three part cables 4 are run as a part cable composite unit lying next to one another in a parallel manner in the longitudinal direction L. The part cables 4 are preferably combined or assembled in a triangle-shaped manner as in FIG. 1. To aid the drawing-in into the pipe 20, the part cable composite unit, that is to say the cable 2, is provided with a carrier 26 containing several rolling elements 44 according to FIG. 2. Each of the rolling elements 44 is set inclined at a suitable setting angle W in order to obtain a rotation, that is to say here a stranding of the three part cables 4, when the cable 2 is conveyed in the longitudinal direction L. All the rolling elements 44 are preferably set in an advantageous manner at the same setting angle W.

A further carrier 26 with rolling elements 44 is mounted on the cable 2 at regular spacing's A, as a result of which the individual rolling elements 44 are in each case relieved to the effect that forces acting correspondingly on them are distributed in an expedient manner to all the rolling elements 44.

Each of the rolling elements 44 preferably sits or abuts against the inside wall 50 of the pipe 20, that is to say is in contact with the inside wall. This is also shown in particular in FIG. 5, in which in each case only two rolling elements 44 are visible on account of the triangular geometry of the frame 24. In order to compensate for possible irregularities of the inside wall 50, each rolling element 44 is provided with a spring device (not shown here) which exerts a spring force in the radial direction with reference to the longitudinal axis A1 of the cable 2 and as a result presses the rolling element 44 against the inside wall 50.

When drawing-in the cable 2 in the longitudinal direction L into the pipe 20, a pulling-in or also an insertion force directed in the longitudinal direction L is then translated in part into a turn in the direction of rotation by the rolling elements 44. As a result, the cable 2 is rotated in such a manner that the three part cables 4 are stranded together and as a result, in particular, a suitable induction cable is provided.

For servicing or exchanging the entire cable 2 or parts thereof, it is appropriately possible to remove the cable 2 out of the pipe 20, that is to say, in particular, the drawing-in process is reversible. As a result, it is possible, in particular, to undo the stranding and then, for example, to exchange just one of the part cables 4. In a preferred manner, the rolling elements 44 are adjusted for removal in such a manner that the setting angle W is approximately 90°. In this case, the axis of rotation A2 is perpendicular to the longitudinal direction L and the cable 2 is advantageously removable out of the pipe 20 without influencing the stranding.

The following is a summary list of reference numerals and the corresponding structure used in the above description of the invention:

2 Cable
4 Part cable
6 Strain relief device
8 Core bundle
10 Cable core
12 Inside layer
14 Outside layer
16 Sheathing
18 Triangle (cable cross section)
20 Pipe
22 Laying aid
24 Frame
26 Carrier
28 Outside surface (of the frame)
30 Inside surface (of the frame)
32 Frame corner
34 Separation point (on the frame)
36 Part
38 Web
40 Sensor module
42 Sensor
44 Rolling element 46 Rolling surface
48 Support
50 Inside wall (of the pipe)
52 Drive device
54 Strain relief device
56 Profiling
58 Groove
60 Entry opening
A Spacing
A1 Longitudinal axis (cable)
A2 Axis of rotation (with reference to the rolling of the rolling element)
A3 Axis of rotation (with reference to adjusting the setting angle)
A4 Spacing (between the rolling element and the longitudinal axis)
D Direction of rotation
L Longitudinal direction
P Period (also lay length)
W Setting angle

The invention claimed is:

1. A cable, comprising:
a cable body extending along a longitudinal axis in a longitudinal direction and configured to be laid in a pipe; and
a laying aid mounted on said cable body, said laying aid is realized in such a manner that said cable body is rotated about the longitudinal axis when being inserted into the pipe, said laying aid having a carrier, and on said carrier are mounted a plurality of rolling elements which are supported so each of said rolling elements is rotatable about an axis of rotation, wherein the axis of rotation is at a predetermined setting angle with respect to the longitudinal direction where the predetermined setting angle is greater than 0° and less than 90°.

2. The cable according to claim 1, wherein the predetermined setting angle is adjustable, and for adjusting the predetermined setting angle each of said rolling elements is mounted so as to be rotatable about a further axis of rotation which extends radially from the longitudinal axis.

3. The cable according to claim 1, wherein each of said rolling elements is disposed at an adjustable spacing from the longitudinal axis.

4. The cable according to claim 1, wherein said carrier includes a frame which encompasses said cable body with an outside surface on which said rolling elements are mounted.

5. The cable according to claim 4,
wherein said frame contains a number of rounded frame corners; and
further comprising several part cables, wherein one of said part cables abuts against an inside of said frame in each of said frame corners.

6. The cable according to claim 1, wherein in the longitudinal direction the cable further comprising a strain relief device which is fastened on said laying aid.

7. The cable according to claim 1, wherein said laying aid has a drive device.

8. The cable according to claim 1, wherein said laying aid has a helical profiling.

9. The cable according to claim 1, wherein the cable is an induction cable.

10. A method for laying a cable extending in a longitudinal direction, which comprises the steps:
providing a laying aid; and
laying the cable in the longitudinal direction, when being laid, the cable is rotated with a help of the laying aid about a longitudinal axis which extends in the longitudinal direction, the laying aid having a carrier, and on the carrier are mounted a plurality of rolling elements which are supported so each of the rolling elements is rotatable about an axis of rotation, wherein the axis of rotation is at a predetermined setting angle with respect to the longitudinal direction where the predetermined setting angle is greater than 0° and less than 90°.

11. The method according to claim 10, wherein the cable includes several part cables which are stranded together when being laid.

12. The method according to claim 10, which further comprises carrying out the laying of the cable in the longitudinal direction by drawing the cable into a pipe which extends in the longitudinal direction.

13. The method according to claim 12, which further comprises forming the laying aid with a profiling which is realized on an inside surface of at least one of the pipe or on the cable.

14. The method according to claim 10, which further comprises rotating the cable by means of the rolling elements which are mounted on the laying aid and are set at an angle.

15. A laying aid for laying a cable, the laying aid comprising:
a laying aid body mounted on the cable, said laying aid body being realized in such a manner that the cable is rotated about a longitudinal axis when being inserted into a pipe, said laying aid having a carrier, and on said carrier are mounted a number of rolling elements which are supported so each of said rolling elements is rotatable about an axis of rotation, wherein the axis of rotation is at a predetermined setting angle with respect to a longitudinal direction of the cable where the predetermined setting angle is greater than 0° and less than 90°.

* * * * *